(12) United States Patent
Gaillard et al.

(10) Patent No.: US 6,504,980 B1
(45) Date of Patent: Jan. 7, 2003

(54) HIGHLY COMPACT OPTICAL FIBER COMMUNICATIONS CABLE

(75) Inventors: Pierre Gaillard, Hickory, NC (US); Steven Xuefeng Shen, Hickory, NC (US)

(73) Assignee: Alcatel, Paris (FR)

( * ) Notice: Subject to any disclaimer, the term of this patent is extended or adjusted under 35 U.S.C. 154(b) by 7 days.

(21) Appl. No.: 09/590,167

(22) Filed: Jun. 9, 2000

Related U.S. Application Data

(60) Provisional application No. 60/152,247, filed on Sep. 3, 1999.

(51) Int. Cl.[7] .................................................. G02B 6/44
(52) U.S. Cl. ...................................................... 385/112
(58) Field of Search ................................ 385/100, 109, 385/110, 112–115; 174/113 A, 113 AS, 117 A

(56) References Cited

U.S. PATENT DOCUMENTS

| 5,369,720 | A | | 11/1994 | Parry et al. | |
|---|---|---|---|---|---|
| 5,703,984 | A | | 12/1997 | Carratt et al. | |
| 5,761,361 | A | * | 6/1998 | Pfandl et al. | 385/112 |
| 5,970,196 | A | * | 10/1999 | Greveling et al. | 385/114 |
| RE37,028 | E | * | 1/2001 | Cooke et al. | 385/112 |
| 6,226,431 | B1 | * | 5/2001 | Brown et al. | 385/114 |

* cited by examiner

Primary Examiner—Khiem Nguyen
(74) Attorney, Agent, or Firm—Sughrue Mion, PLLC

(57) ABSTRACT

A cable having improved performance during temperature fluctuations includes an outer sheath with a central cavity that does not have a centrally located anchoring member. A plurality of buffer tubes are provided in the central cavity. At least one optical fiber is provided in each of the buffer tubes. The buffer tubes are coupled together to prevent slippage between the buffer tubes, thereby forming a core unit. An adhesive may be provided to couple together the buffer tubes. Alternatively, the buffer tubes may be fused together.

15 Claims, 6 Drawing Sheets

HIGHLY COMPACT OPTICAL FIBER COMMUNICATIONS CABLE

CROSS REFERENCE TO RELATED APPLICATIONS

This application is an application filed under 35 U.S.C. §111(a) claiming benefit pursuant to 35 U.S.C. §119(e)(1) of the filing date of the Provisional Application No. 60/152,247 filed Sep. 3, 1999, pursuant to 35 U.S.C. §111(b).

FIELD OF THE INVENTION

The present invention relates in general to optical cables, and more particularly to a cable having buffer tubes in which optical fibers are loosely provided. The optical (fiber) cables are used, for example, in telecommunications to transmit voice, data, video and multimedia information.

BACKGROUND

Many factors are considered when designing cables, including low costs and compact size. A compact cable design is important in order to attain a high efficiency (i.e., a high fiber count in a small cable volume). Another consideration is the cable's performance during temperature variations in the environment in which the cable is installed. Temperature variations cause the cable to expand and contract, which leads to signal attenuation. Signal attenuation is particularly problematic in central cavity cable designs.

With reference to FIG. 1, a central cavity cable 1 has an outer sheath 2 in which buffer tubes 3 are provided. Each of the buffer tubes 3 surrounds a plurality of loosely provided optical fibers 5. The outer sheath 2 and buffer tubes 3 are typically made from plastic materials. These plastic materials have a much higher coefficient of thermal expansion than the glass materials that make up the optical fibers 5. Therefore, during temperature variations, the outer sheath 2 and buffer tubes 3 tend to deform more severely than the optical fibers 5. This relative deformation difference causes the buffer tubes 3 to bend, or in an extreme case, buckle, thereby increasing signal loss.

On one hand, the buffer tube deformation is negligible because the buffer tubes 3 are thin walled and delicate relative to the optical fibers 2. In fact, for cable compactness, it is desirable to make the buffer tubes 3 with as little material as possible. Thus, the optical fibers 5 are stiff enough to withstand and counteract the relatively weak deformation forces exerted by the delicate buffer tubes 3. Further, the buffer tubes 3 have free space in which the optical fibers 5 may move. That is, the optical fibers 5 are loosely provided in the buffer tubes 3. Therefore, some buffer tube deformation may occur without having any affect on the optical fibers 5 therein.

On the other hand, the outer sheath deformation is more problematic. In particular, the outer sheath 2 is much bulkier (made from more material per unit length) than the buffer tubes 3. Therefore, the outer sheath 2 drastically deforms due to thermal fluctuations. Moreover, the outer sheath's deformation forces are much stronger than the optical fibers 5 are capable of withstanding.

Consider, for example, a scenario in which the temperature of the environment drops from a relatively high temperature as shown in FIG. 2(A) to a relatively low temperature as shown in FIG. 2(B). FIG. 2(A) shows the cable 1 in a non-buckled state. At some point 10 along the length of the cable 1, the inner surface of the outer sheath 2 frictionally engages with the outer surface of one of the buffer tubes 3' ("a contacting buffer tube").

Turning to FIG. 2(B), as the temperature drops, the buffer tubes 3, 3' may contract (or deform) slightly in a longitudinal direction 15. But this contraction is counteracted by the stiffness of the optical fibers 5, or altogether avoided due to the free space within the buffer tubes 3, 3'. However, due to its bulkiness, the outer sheath 2 contracts severely in the longitudinal direction 15. The bulkiness of the outer sheath 2 also creates substantial contraction forces. The frictional engagement at the contact point 10 effectively combines the contraction forces from the outer sheath 2 and the contacting buffer tube 3'. These combined contraction and contact forces overcome the stiffness of the optical fibers 5 in the contacting buffer tube 3'. Therefore, as the contact point 10 moves to the right (for example) a certain distance d, the contacting buffer tube 3' bends, and in extreme conditions, buckles. Eventually, the inner diameter of the contacting buffer tube 3' engages with and bends the optical fibers 5 therein. This phenomenon of fiber microscopic bending/buckling due to the combined contacting and frictional forces is known in the art as micro bending. Micro bending increases signal loss.

Conventionally, two techniques have been employed to overcome the micro bending resulting from thermal deformation of cable elements. The first technique involves incorporating bigger and more anchoring elements into the center of the cable's central cavity. FIG. 2(C) illustrates one example of a centrally located anchoring element, which is referred to in the art as a central strength member 4. The buffer tubes 3 are stranded around the central strength member 4 during cable fabrication. In this way, the central strength member 4 serves to "anchor" the buffer tubes 3. The central strength member 4 is formed from materials that are stiff, and have very small thermal deformation characteristics. Consequently, the central strength member 4 provides buckling resistance and counteracts outer sheath contractions. The second technique is to design the cable 1 with increased free space in which the buffer tubes 3 or optical fibers 5 are moveable. This increased free space enables the optical fibers 5 to readily move away from a buckled portion of the contacting buffer tube 3'.

Although these conventional techniques are generally thought to be acceptable, they have shortcomings in terms of design efficiency. Namely, both techniques increase cable dimensions, and therefore reduce cable efficiency (i.e., smaller fiber count per cable volume). Furthermore, the centrally located anchoring members significantly reduce the cable's flexibility, which is particularly problematic for some applications.

It is therefore an object of this invention to provide a unique cable design having improved performance throughout temperature variations that occur in the installed environment. More specifically, the object of this invention is to effectively avoid optical fiber micro bending (and the associated signal loss) that result from thermal deformation, without reducing the fiber count per cable volume.

SUMMARY OF THE INVENTION

The invention resides in a cable having an outer sheath with a central cavity in which a plurality of buffer tubes is provided. At least one optical fiber is provided in each of the buffer tubes. The buffer tubes are coupled together to prevent slippage between the buffer tubes. The coupled together buffer tubes have an increase buckling resistance. According to one aspect of the invention, an adhesive couples together the buffer tubes. According to another aspect of the invention, the buffer tubes are fused together.

The above and other features of the invention including various and novel details of construction will now be more particularly described with reference to the accompanying drawings and pointed out in the claims. It will be understood that the particular cable embodying the invention is shown by way of illustration only and not as a limitation of the invention. The principles and features of this invention may be employed in varied and numerous embodiments without departing from the scope of the invention.

DETAILED DESCRIPTION OF THE INVENTION

Figure 1:
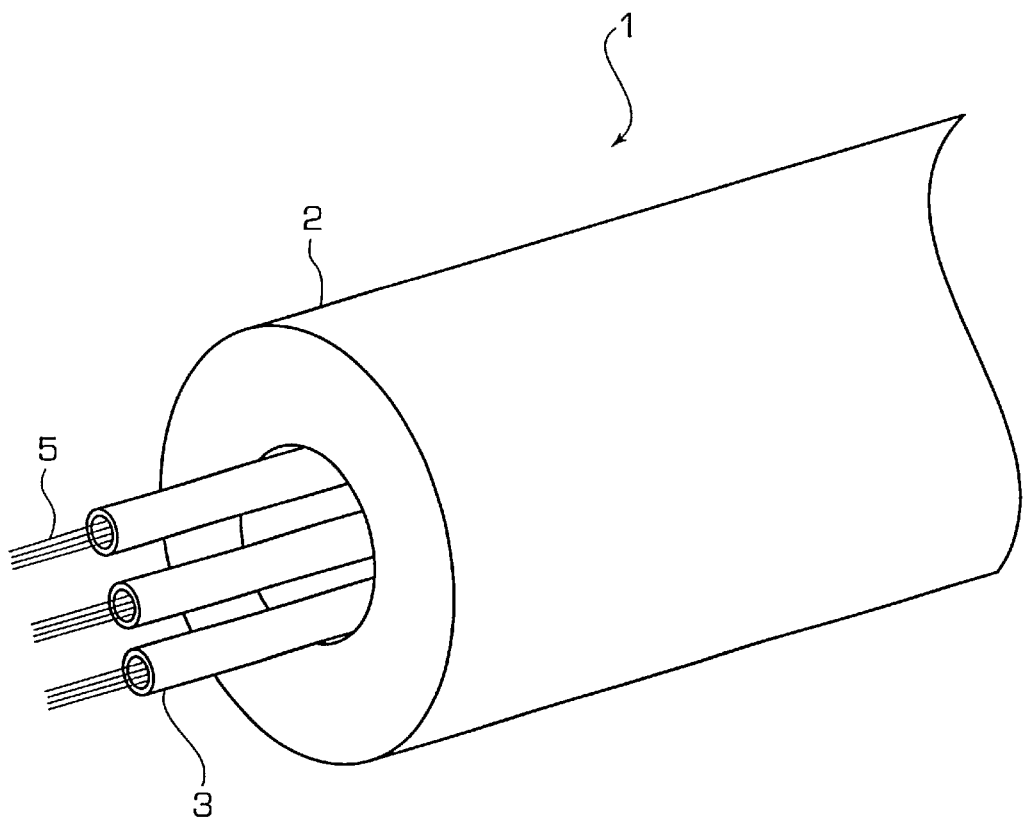
FIG. 1 is a perspective view of a central cavity cable.
Figure 2A:
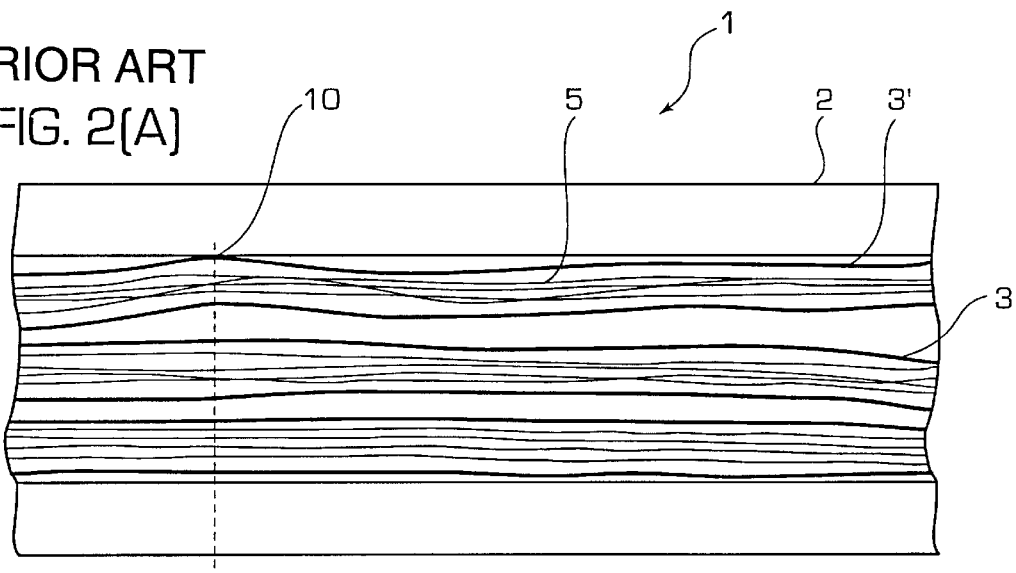
FIGS. 2(A) and 2(B) show longitudinal cross sections of the cable shown in FIG. 1.
Figure 2B:
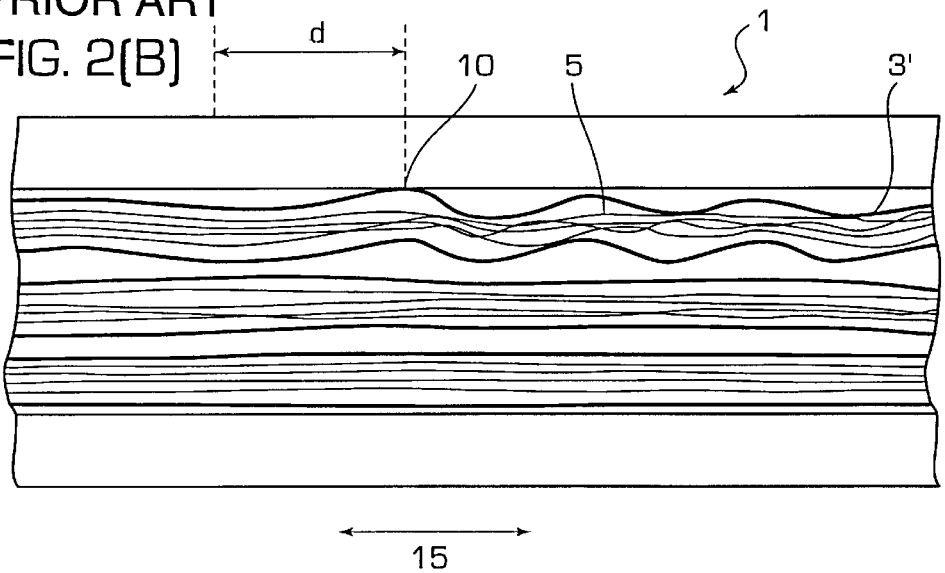
Figure 2C:
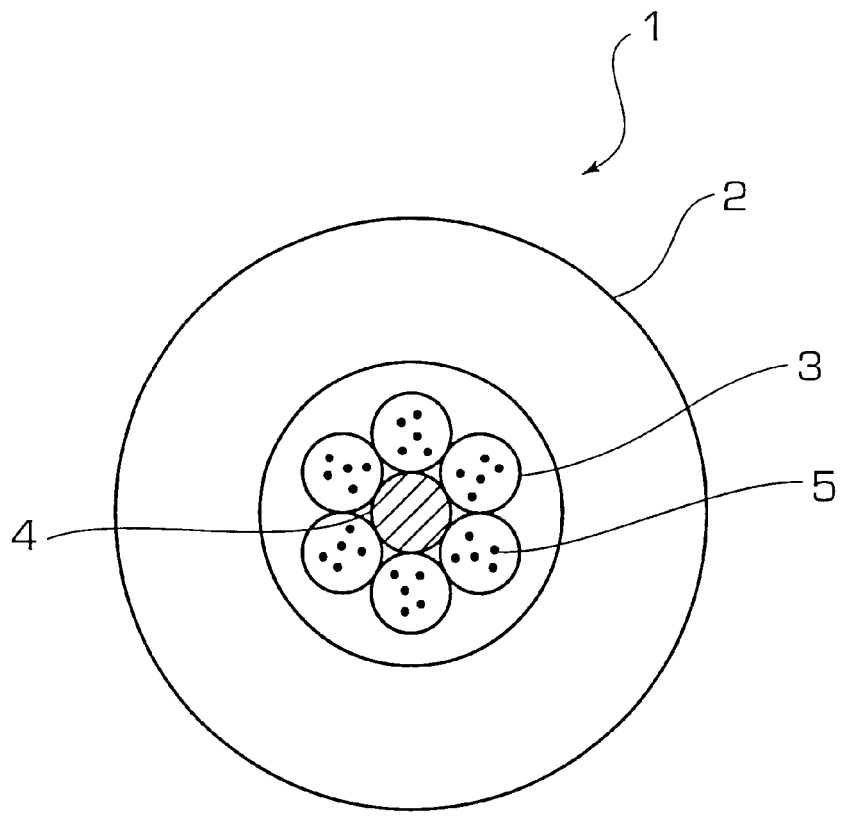
FIG. 2(C) shows a central cavity cable incorporating a centrally located anchoring member.
Figure 3:
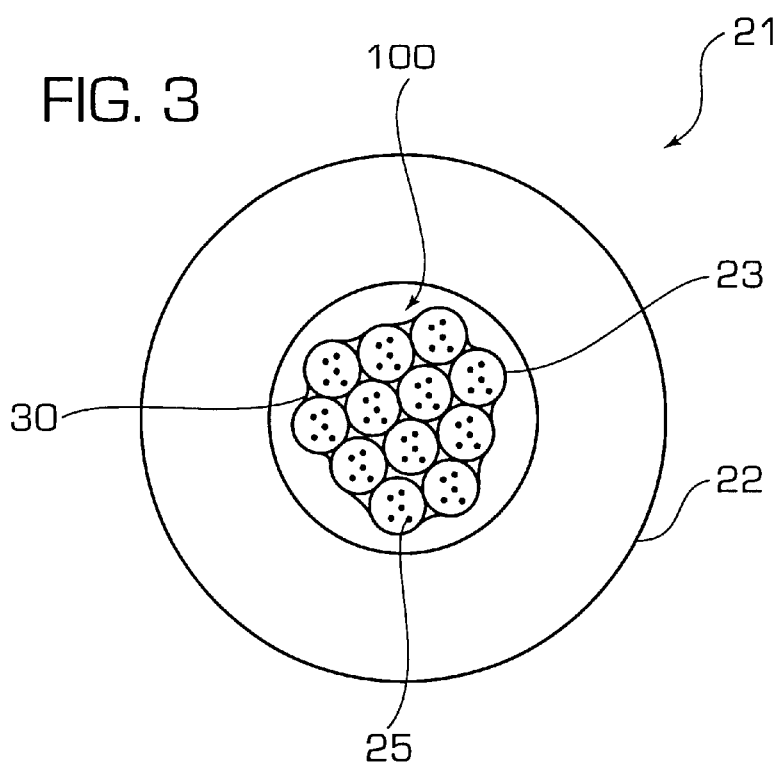
FIG. 3 shows a transverse cross section of a cable according to a first embodiment of the present invention.

FIG. 3 shows a cable 21 according to an embodiment of the present invention. The cable 21 has an outer sheath 22 in which buffer tubes 23 are provided. Each of the buffer tubes 23 surrounds a plurality of loosely provided optical fibers 25.

Importantly, the buffer tubes 23 are coupled together to prevent slippage between adjacent buffer tubes 23. In this respect, the buffer tubes 23 form an undivided, compact core unit 100. It is to be appreciated that the coupling is strong enough to provide buckling resistance; but the buffer tubes can be easily separated for easy cable termination as discussed below. The buffer tube coupling may be achieved by a variety of means. For example, as shown in FIG. 3, an adhesive 30 may bond the buffer tubes 23 together. Depending on the application and manufacture process, the adhesive 30 may be a hot-melt adhesive or an ultraviolet light curable adhesive. Such adhesives are well known in the relevant art and therefore a detailed discussion of the same will not be provided.

Preferably, the bond strength of the adhesive 30 is less than the tear strength of the buffer tubes 23. Accordingly, when accessing the optical fibers 25 (to perform fiber splicing for example), a selected buffer tube 23 may be easily uncoupled from the core unit 100.

It is to be appreciated that the cable 21 does not include an anchoring element located at the center of the cavity. This feature advantageously provides the present cable design with improved cable efficiency. That is, the present cable design has an increased fiber count per cable volume as compared to that of conventional cable designs.

Figure 4:
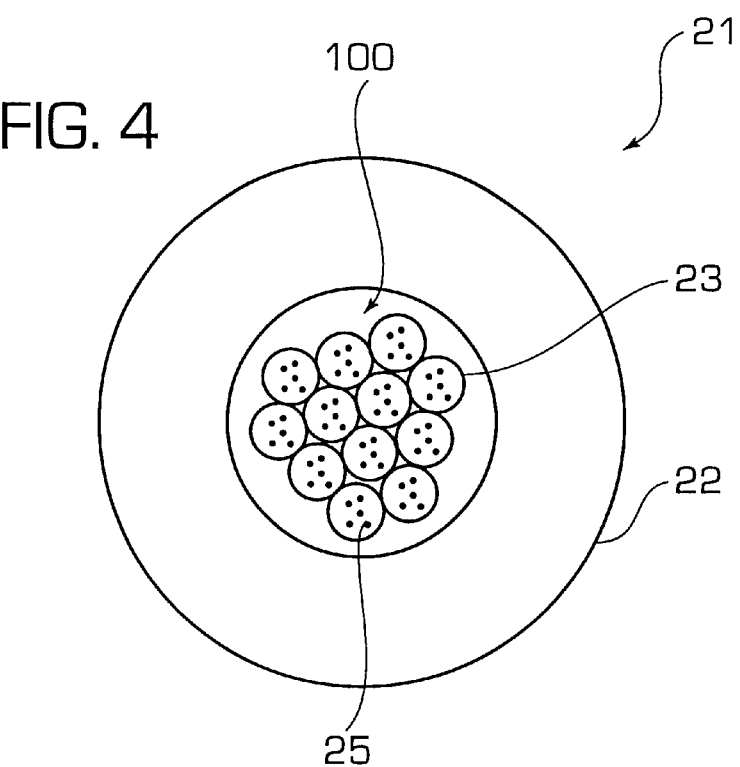
FIG. 4 shows a transverse cross section of a cable according to a second embodiment of the present invention.

FIG. 4 shows a second embodiment of the invention. The second embodiment has the same elements as those shown in FIG. 3. However, the embodiment in FIG. 4 does not use an adhesive to couple together the buffer tubes 23. Instead, the buffer tubes 23 are fused together to form the core unit 100.

Fusion may be achieved thermally, chemically, or by a combination of the two approaches. For example, for thermal fusion, the buffer tubes 23 are heated over their melting temperature and pressed together so that the contacting surfaces of adjacent buffer tubes 23 become bonded together. Preferably, the heating of the buffer tubes occurs just after an extrusion step to achieve the desired thermal fusion effect. In addition to (or as an alternative to) the above thermal fusion, a chemical may be provided on the buffer tubes to achieve a chemical fusion effect, i.e., a chemical bond between the contacting surfaces of adjacent buffer tubes 23.

In a third embodiment, the cable 21 has the same elements as the first and second embodiments. However, the buffer tubes 23 are not held together by an adhesive (first embodiment) or fusion boding (second embodiment). Instead, the buffer tubes 23 have high friction, outer surfaces. For example, the outer surfaces may be textured. Further, a thread may wrap around and hold the buffer tubes 23 in contact with each other. The high friction surfaces and the thread cooperate to prevent slippage between adjacent buffer tubes 23. The buffer tubes 23 and the thread form the core unit 100.

In a fourth embodiment, the buffer tubes 23 are mechanically coupled together. For example, one buffer tube 23 may have a grooved outer surface that meshes with a complementary shaped outer surface of an adjacent buffer tube 23. Depending on their shapes (and meshing interaction), the grooves in the outer surfaces of the buffer tubes 23 may function to prevent slippage between adjacent buffer tubes, as well as hold the buffer tubes 23 together in an undivided, compact core unit 100. Alternatively, the grooved outer surfaces may be provided in conjunction with another coupling means, such as an adhesive (first embodiment) or fusion bonding (second embodiment).

Figure 5A:
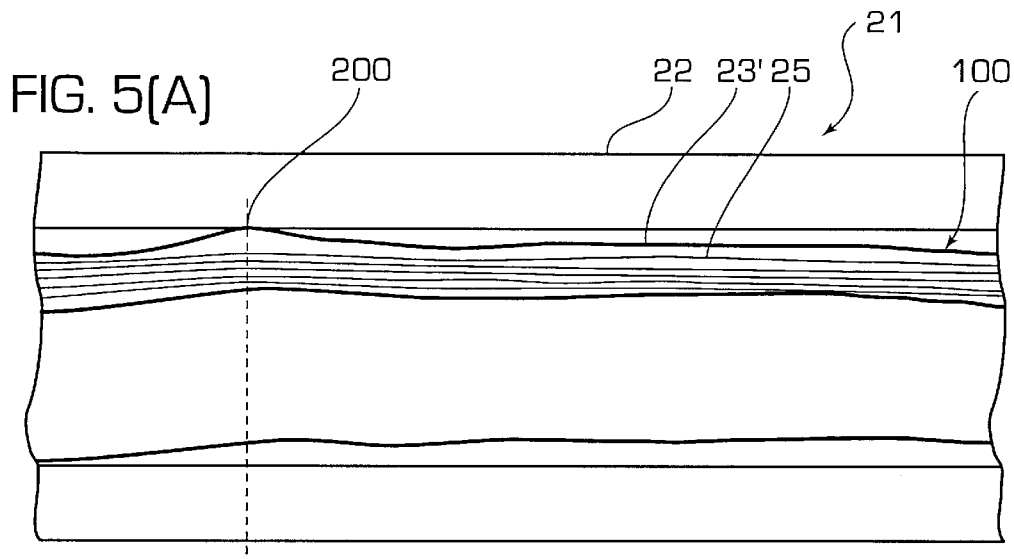
FIGS. 5(A) and 5(B) show longitudinal cross sections of the cable shown in FIG. 3.
Figure 5B:
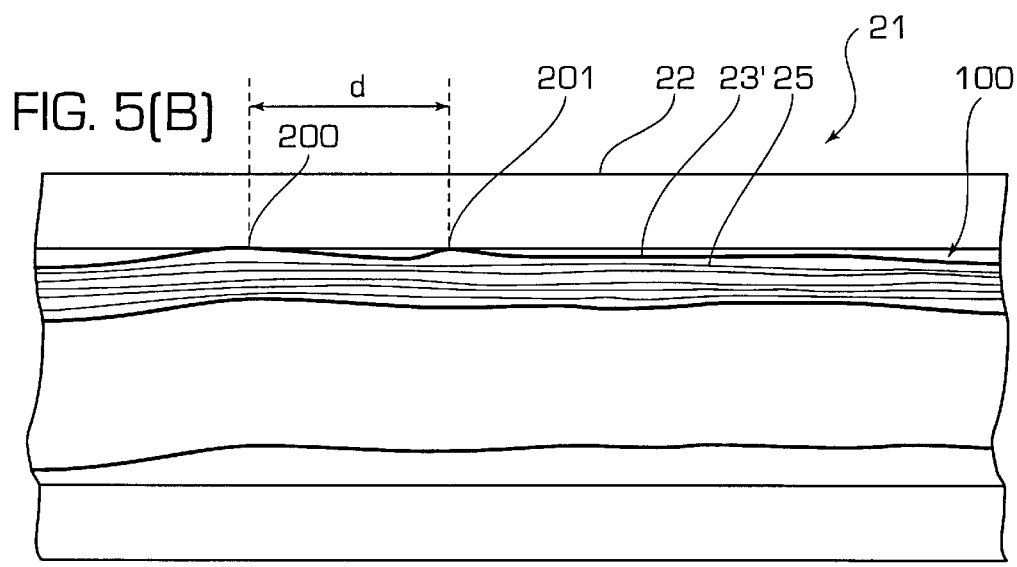

The advantageous affects of the present invention will now be described with reference to FIGS. 5(A) and 5(B). FIG. 5(A) shows the cable 21 at a relatively high temperature, and FIG. 5(B) shows the cable 21 at a relatively low temperature. For clarity, FIGS. 5(A) and 5(B) show the core unit 100 generally, and the details of only one buffer tube 23 and the optical fibers 25 therein.

As shown in FIG. 5(A), a point 200 exists along the length of the cable 21 at which the inner surface of the outer sheath 22 frictionally engages with the outer surface of the illustrated buffer tube 23' ("the contacting buffer tube").

Turning to FIG. 5(B), as the temperature drops, the buffer tubes 23,.23' may contract (or deform) slightly in a longitudinal direction 15. But the buffer tube contraction is counteracted by the stiffness of the optical fibers 25, or altogether avoided due to the free space within the buffer tubes 23, 23'. The outer sheath 22 also contracts longitudinally. Due to its bulkiness, the outer sheath 22 contracts more severely and with more force. However, the core unit 100 does not bend/buckle. Instead, the core unit 100 has enough buckling resistance to overcome the frictional engagement at the contact point 200. Consequently, at the contact point 200, the inner surface of the outer sheath 22 slides across the outer surface of the contacting buffer tube 23'. That is, the initial contact surface 201 of the outer sheath 22 may move relative to the core unit 100 a certain distance d.

This advantageous sliding action is realized because the core unit 100 has an increased buckling resistance compared to a single, uncoupled buffer tube 23. This increased buckling resistance may be attributable to at least the following factors. First, when the buffer tubes 23 are coupled together so that their surfaces do not slip relative to each other, the transverse forces exerted by the outer sheath 22 are spread over the combined cross sectional areas of all of the buffer tubes 23, 23' rather than the cross sectional area of the contacting buffer tube 23' only. Therefore, when the same transverse force is applied, the core unit 100 deflects less in a transverse direction. Second, the stiffness of all of the optical fibers 25 (not just the optical fibers in the contacting buffer tube 23') counteract the transverse forces applied by the outer sheath 22.

It will be appreciated that the buckling resistance of the core unit 100 needs to be increased enough to overcome the frictional engagement at the contact point 200 between the outer sheath 22 and the contacting buffer tube 23'.

Due to the sliding action between the core unit 100 and the outer sheath 22 at the contact point 200, the core unit 100 does not buckle. This action will eliminate or greatly reduce the localized sharp bends or buckle of the buffer tubes at the contact positions. Accordingly, the contacting buffer tube 23' does not engage with and bend/buckle the optical fibers 25 therein. In this way, the present cable design significantly reduces the micro bending phenomenon (and the associated increased signal attenuation) that would otherwise occur due to temperature fluctuations.

In the present cable design, conventional materials may be used to fabricate the cable elements. Conventional materials include, but are not limited to, polyethylene, polypropylene, polyvinyl chloride, polyester, polyamide or copolymer or polymer blend of the above. Such materials are well known in the relevant art, and therefore a detailed description of the same will not be provided. New materials may also be formulated to generate fusion between the buffer tubes. The characteristics of such new materials will include, but not be limited to, lower surface smoothness and low surface thermal stability.

Figure 6:
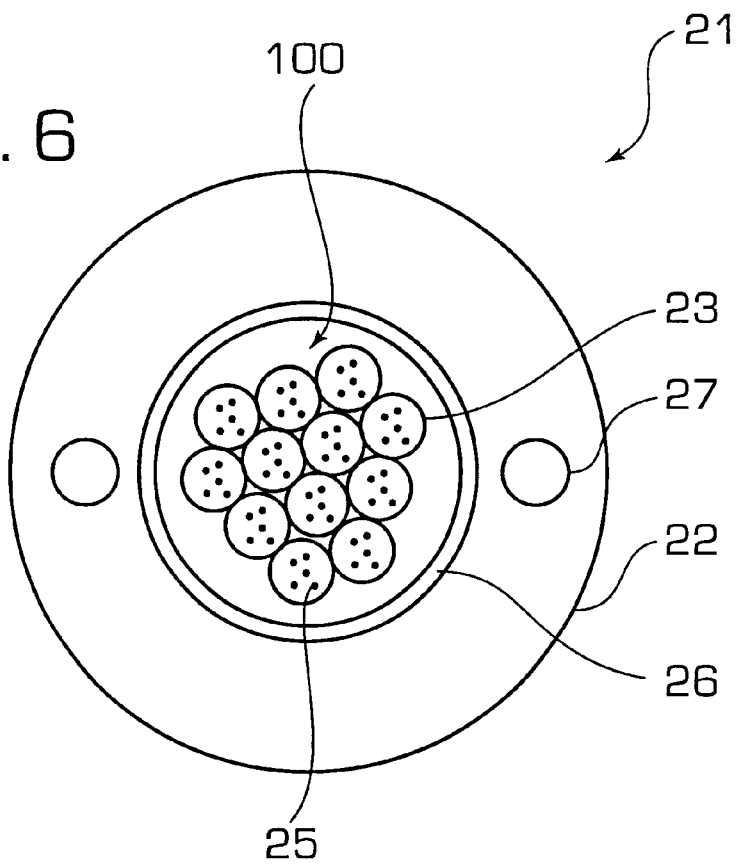
FIG. 6 shows a transverse cross section of the cable shown in FIG. 4, incorporating additional cable elements.

Of course other elements may be incorporated into the present cable design. For example, as shown in FIG. 6, the cable 21 may include an armoring 26 provided in the outer sheath 22, or strength members 27 in the outer sheath 22. The cable 21 may also include yarns, tapes, and water swellable elements. All of these additional cable elements are well known in the art and therefore a detailed description of the same will not be provided.

A cable according to the present invention provides significant advantages. Namely, the present cable has increase performance during temperature variations, without compromising compactness.

What is claimed is:

1. A cable comprising:
   an outer sheath with a central cavity that does not have an anchoring element located at a center of said central cavity;
   a plurality of buffer tubes provided in said central cavity; and
   at least one optical fiber provided in each of said buffer tubes,
   wherein said buffer tubes are coupled together to prevent slippage between said buffer tubes.

2. The cable according to claim 1, further comprising:
   an adhesive coupling together said buffer tubes.

3. The cable according to claim 2, wherein said adhesive is a hot-melt adhesive.

4. The cable according to claim 2, wherein said adhesive is an ultraviolet light curable adhesive.

5. The cable according to claim 2, wherein a bond strength of said adhesive is less than a tear strength of said buffer tubes.

6. The cable according to claim 1, wherein said buffer tubes are fused together.

7. The cable according to claim 1, further comprising:
   an armoring provided in said outer sheath and surrounding said buffer tubes.

8. The cable according to claim 1, wherein said at least one optical fiber is loosely provided in each of said buffer tubes.

9. A method of making a cable, the method comprising the steps of:
   positioning at least one optical fiber in each of a plurality of buffer tubes;
   coupling the buffer tubes together to prevent slippage between the buffer tubes; and
   providing an outer sheath over the coupled together buffer tubes, such that a cavity of the outer sheath does not have an anchoring element located at a center of the cavity.

10. The method according to claim 9, wherein the coupling step comprises providing an adhesive on the buffer tubes to couple together the buffer tubes.

11. The method according to claim 10, wherein the adhesive is a hot-melt adhesive.

12. The method according to claim 10, wherein the adhesive is an ultraviolet light curable adhesive.

13. The method according to claim 10, wherein the adhesive has a bond strength that is less than a tear strength of the buffer tubes.

14. The method according to claim 9, wherein the coupling step comprises fusing the buffer tubes together.

15. The method according to claim 9, further comprising the step of:
   providing an armoring in the outer sheath to surround the buffer tubes.

* * * * *